Jan. 20, 1925.

R. E. MANLEY 1,523,486

TRUCK WHEEL TRUCK

Filed Nov. 1, 1921

Inventor
Robert E. Manley
Church & Church, Attorneys

Patented Jan. 20, 1925.

1,523,486

UNITED STATES PATENT OFFICE.

ROBERT E. MANLEY, OF YORK, PENNSYLVANIA.

TRUCK WHEEL TRUCK.

Application filed November 1, 1921. Serial No. 512,069.

*To all whom it may concern:*

Be it known that I, ROBERT E. MANLEY, a citizen of the United States, residing at York, in the county of York and State of Pennsylvania, have invented certain new and useful Improvements in Truck Wheel Trucks; and I do hereby declare the following to be a full, clear, and exact description of the same, reference being had to the accompanying drawings, forming part of this specification.

This invention relates to truck wheel trucks and has for its object the provision of such a truck capable of being rolled against a truck wheel resting upon the floor and by means of hoisting mechanism may raise the truck wheel so that it may be easily transported from place to place in a garage or other workshop.

The automobile wheels that are intended for transportation on the vehicle forming the subject matter of the present application are the massive wheels quite usual in modern truck practice and weighing as much as half ton apiece, sizes such as 42″ x 12″ being normal rather than exceptional at the present time. It is not possible to move these wheels from place to place except with the use of a derrick. The present truck obviates much of the difficulty in handling these large wheels, since the truck being on casters may be readily pushed against the wheel while the latter is on the floor and the wheel may later be elevated by turning the hoisting mechanism which throws the entire weight of the wheel on two forwardly extending beveled fingers carried by the base of the truck.

Among the novelties of the present application are the open frame of the truck, the pivoted side arms and the provision of retaining means to embrace the truck wheel on opposite sides of the center to prevent the wheel from toppling from its support should the truck encounter an obstruction or a depression in the floor of the workshop.

In the drawings,—

Figure 1:
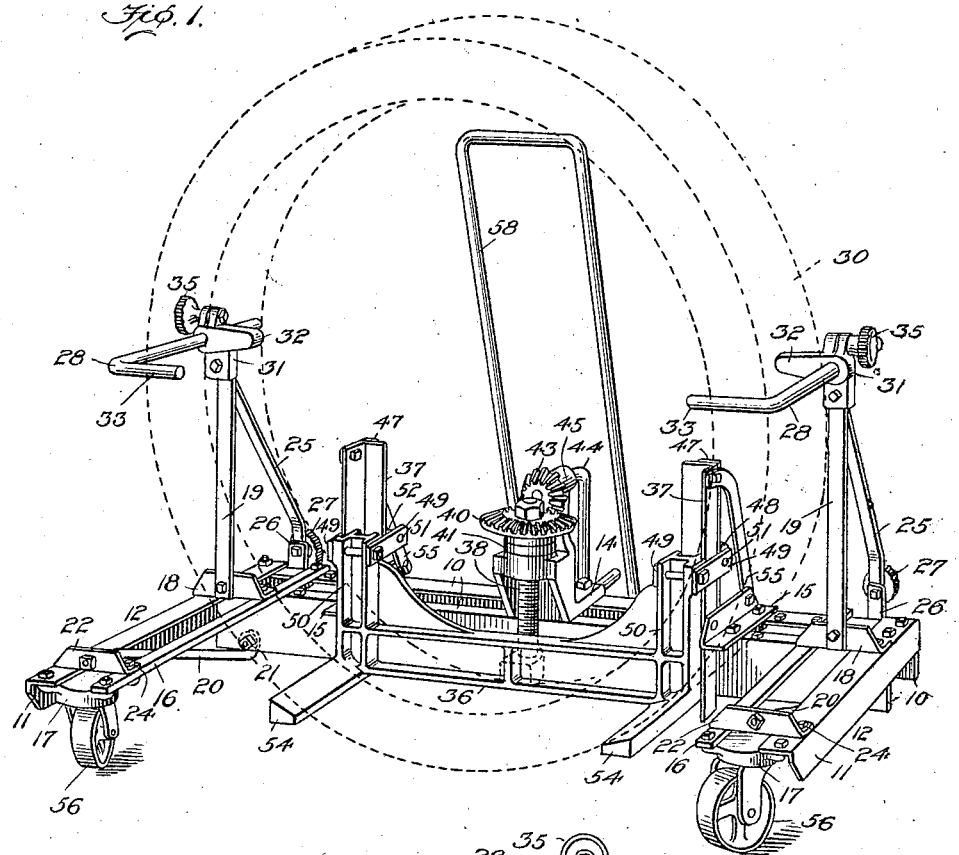
Figure 1 is a perspective view of my device in its preferred form with the truck wheel indicated in dotted lines.
Figure 2:
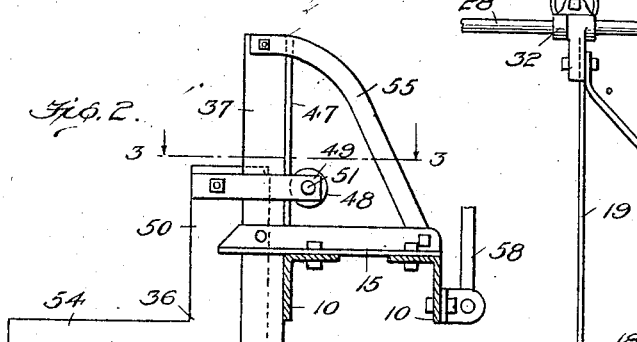
Fig. 2 is a plan view thereof.
Figure 4:
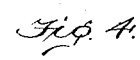
Fig. 4 is a vertical section illustrating the retainer and pivoted arm in side elevation.
Figure 3:
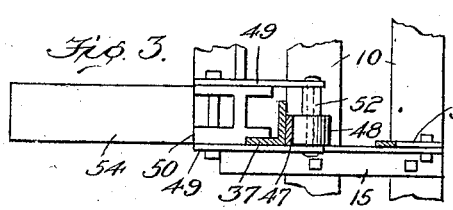
Fig. 3 is a section taken on line 3—3 of Fig. 2.

The truck consists of a three-sided frame, the longitudinal member or base 10 being composed of a pair of beams of rolled section, preferably angles, secured together at either end by the smaller angle irons 11 of the extensions 12 which are arranged at right angles to the base so as to form with it an open-sided rectangle. In addition to these end connections the beams of the base are maintained in fixed position by their engagement with the overhanging cast bracket 14, the ledges 15, and the inner bars 16 cooperating with the angles 11 to form the extensions 12.

The extension members 11 and 16 are secured together at their rear end by their connection with the beams of the base, at their front ends by the block 17 of the caster frame, and intermediately by the clip 18 in which is pivotally secured the upright arm 19 of the wheel retaining means. A tie rod 20 is formed at its rear end into an eye which embraces the bolt 21 securing the two sections of the base together in spaced relation and at its forward end rises and is secured in a small clip 22 located at the front end of the extension and secured in place by the bolts 24 holding in place the caster frame.

The arm 19 preferably has a cooperating rear piece 25 pivoted to a short strip 26 bolted to the rear beam of the base in such manner that the two pivots shall be coaxial. The arm 19 is preferably loosely pivoted in the clip 18, but the rear piece 25 is provided with a knurled cap nut 27 so that the arm may be clamped at the proper angle to secure the retainer 28 in position against the truck wheel 30. This retainer 28 is slidably and rotatably mounted in a clamp member 31 which is provided with an integral lug 32, the latter forming the back stop for the truck wheel while the right angularly bent end 33 of the retainer rod forms the front stop. The retainer rod end 33 is adjusted at the proper distance from the lug 32 to correspond with the width of the truck wheel, is then turned to extend in the same direction as the integral lug and then, after the wheel is in place on the truck the rod is brought into engagement with the tire and clamped in such position by turning the knob 35.

The hoisting mechanism consists generally in a casting 36 slidably mounted against the guides 37 by engagement of the non-rising screw 38 which is threaded into a lug extending rearwardly from the casting. The screw 38 carries at its upper end a bevel gear 40 resting upon a thrust bearing 41 supported by the bracket 14 and meshing with a pinion 43 carried by the crank 44 which is journaled in a horizontal bearing in an upstanding portion 45 of the bracket.

The guides 37 are preferably formed of strips of angle iron reinforced on their rear sides by plates 47 which form a runway on which the anti-friction roller 48 rides. This roller 48 is carried in a box formed by two side pieces 49 secured to the H shaped upright 50 of the casting and is journaled on a pivot bolt 51 which also carries a spacing sleeve 52 to hold the roller 48 in proper position. Forwardly from the lower front corners of the casting 36 project fingers 54 of somewhat less length than the extensions 12 and arranged parallel thereto. These fingers are beveled downwardly from their outer to their inner side faces so as to more readily engage the periphery of the truck wheel. The guides 37 are preferably strengthened by a brace 55 extending to the rear of the ledge 15 and bowed at the top to avoid interference by the outer plate 49 or the roller 48. The base of the truck is provided with a caster near either end thereof, and the extensions are provided at their free ends with casters 56 as previously described.

It is thought that the operation of the truck is apparent from the foregoing description. The arms 19 are loosened by means of the nut 27 and are swung over to a considerable angle so as to easily clear the truck wheel. The retaining means are now placed the width of the tire from the lugs 32 and the truck is pushed by means of the handle 58 so that the two fingers 54 will each be to one side of the lower edge of the tire. By turning the crank 44 the truck wheel will be elevated and will be supported entirely by the two fingers 54, the weight being carried partly by the engagement of the screw with the lug of the casting but mainly by the frictional engagement of the lower rear edge of the casting with the vertical face of the front beam of the base. The arms 19 are now swung up so that the retaining means will engage the wheel which may now be transported with ease and dispatch to the point desired.

What I claim is:

1. In a truck-wheel-truck, a wheeled base, a pair of projecting fingers carried entirely by the base, means for raising said fingers, and retaining means mounted on the base, carried by said base and adapted for movement to engage a truck wheel carried by said fingers.

2. In a truck wheel-truck, a wheeled base, a pair of projecting fingers carried entirely by the base, means for raising said fingers, and retaining means mounted on the base, pivoted to said base on either side of said fingers to cooperate therewith to hold a truck wheel.

3. In a truck wheel-truck, the combination of a wheeled base, a pair of projecting fingers carried thereby, means for simultaneously raising said fingers, means mounted on the base for raising and lowering said fingers, and a pair of extensions on said base extending parallel to said fingers, and a caster on either extension located beyond the plane of the ends of said fingers.

4. In a truck wheel-truck, a base, truck wheel supporting means carried entirely by the base, means on the base for elevating said wheel supporting means, a pair of pivoted arms carried by the base, an integral lug on each arm adapted together to form rear stop members for the truck wheel, and retaining means adjustably secured to said arms to cooperate with said lugs and forming front stop members for said wheel.

5. In a truck, a base, a pair of spaced members extending at right angles to said base at either end thereof to form an open frame, casters at the free end of each of said extension members, a pair of fingers parallel to said extension members, and elevating means mounted on said base between said extension members for raising said fingers simultaneously.

6. In a truck-wheel truck, a base, a plurality of supporting wheels carried by said base, a frame supported by the base alone, means on the base for guiding said frame for vertical movement with respect to said base, means mounted on said base for elevating said frame, a pair of fingers extending from said frame, said fingers being spaced apart a sufficient distance to permit them to pass under the truck-wheel when the latter is resting on the ground and to engage same to lift the truck-wheel upon operation of said elevating means.

7. In a truck-wheel truck, a base, a plurality of parallel spaced extensions, a plurality of fingers supported entirely by the base parallel to said extensions and spaced at such distance from one another as to permit their insertion beneath a truck-wheel when the later is resting on the ground and to engage the truck-wheel upon vertical movement of said fingers, and means mounted on the base for imparting to said fingers vertical movement with respect to the base and extensions.

8. In a truck-wheel truck, a wheeled base, a plurality of parallel extensions at right angles to said base, a caster at the free end of each extension, a sliding elevating frame carried entirely by said base, spaced arms projecting from said elevating frame between said extensions, and means for raising and lowering said frame.

9. In a truck-wheel truck, a wheeled base, a plurality of parallel extensions at right angles to said base, a caster at the free end of each extension, a sliding elevating frame carried by said base, spaced arms projecting from said elevating frame between said extensions, means for raising and lowering said frame and front and rear wheel retaining means at each side of said base for clamping the truck wheel in position on the truck when said elevating means are raised, all of said retaining means being movable radially of a wheel on the truck.

ROBERT E. MANLEY.